Dec. 16, 1969

W. T. WALTER 3,484,720

IONIZED ALKALINE EARTH METAL LASER WITH CYCLIC
EXCITATION AND RELAXATION
Filed April 8, 1966

INVENTOR
WILLIAM T. WALTER

BY
Darby & Darby
ATTORNEYS

# United States Patent Office 3,484,720
Patented Dec. 16, 1969

3,484,720
IONIZED ALKALINE EARTH METAL LASER WITH CYCLIC EXCITATION AND RELAXATION
William T. Walter, Huntington, N.Y., assignor to TRG, Incorporated, Melville, N.Y., a corporation of Minnesota
Filed Apr. 8, 1966, Ser. No. 541,307
Int. Cl. H01s 3/16
U.S. Cl. 331—94.5      12 Claims

ABSTRACT OF THE DISCLOSURE

An ionized metal laser employing inelastic collisions to populate the upper laser level and to depopulate the lower laser level wherein the population and depopulation processes are done cyclically rather than simultaneously is disclosed. The laser is also characterized by the fact that transitions from the upper laser level to the lower laser level (the laser transition) and the (relaxation) transitions from the lower laser level to still lower ionic energy (sink) levels are at least partially forbidden. On the other hand, transitions from the sink level to the upper laser level (the excitation transitions) are allowed or at least less strongly forbidden than the relaxation transition. The laser material employed is an ionized alkaline earth metal of Group II of the Periodic Table, i.e. calcium, strontium, or barium.

---

The present invention relates to ionized metal lasers employing inelastic collisions to populate the upper laser level and to depopulate the lower laser level wherein the population and depopulation processes are done cyclically rather than simultaneously.

The most common form of gas discharge type lasers rely on spontaneous emission either directly or indirectly to relax the lower level. Such a relaxation process limits the efficiency and power output from such gas discharge lasers. Among the causes of such efficiency limitations is that the level spacing required for an untrapped radiative cascade places the upper and lower laser levels well up in the energy level structure. In such a case the excitation energy resulting in useful laser radiation is a small portion of the total excitation energy required for the process; consequently the quantum efficiency is low. Furthermore, with the upper and lower laser levels high in the energy level structure only a small fraction of electrons have the necessary energy for excitation to the upper laser level, and parasitic loss through useless excitation of lower levels also decreases efficiency.

In a previous proposal (Gordon Gould, "Collision Lasers," Applied Optics Supplement 2 of Chemical Lasers, pages 59–67, 1965) some of the above disadvantages were pointed out, and avoidance thereof was proposed by utilization of collision depopulation (relaxation) of the lower laser level. Another technique was disclosed in U.S. Patent application Ser. No. 510,618, filed on Nov. 30, 1965, entitled Low Level Laser With Cyclic Excitation and Relaxation, and assigned to the assignee of this invention. This latter technique substantially lessened the requirements for a proper energy level structure and provided a relatively efficient laser utilizing collision depopulation (relaxation) of the lower laser level. Such technique employs cyclic excitation and relaxation which makes it unnecessary to simultaneously maintain proper conditions for excitation of the upper laser level and for relaxation of the lower laser level. This, naturally, precludes continuous operation of the laser, but there are many laser applications which permit, or even require, pulsed operation. High average power is attainable by a high repetition rate (over 1000 per sec.).

An important feature of the lasers of application Ser. No. 510,618 and the present invention (the latter being referred to hereinafter as ionized metal cyclic lasers) is the fact that the transition between the lower laser level and the sink level (neutral or ionic, as the case may be) is forbidden or at least partially forbidden. The forbidden nature of this transition may arise because the levels are of the same parity, for example. By "forbidden" it is meant except where otherwise specified, that the transition referred to is slower than the practically attainable rise time of the input pulse, e.g., ten nanoseconds.

In the cyclic laser the transition from the sink level to the upper laser level is preferably an allowed transition or in any event not more forbidden than the transition between the lower laser level and the sink level. This provides a mechanism for preferential population of the upper laser level as compared with the lower laser level due to the forbidden transition associated with the lower laser level. The forbidden transition between the lower level and the sink level results in the stimulated emission being self-terminating as the lower level is rapidly filled by stimulated emission from the upper level with a resultant loss in the population inversion. In the cyclic laser the self-termination of the laser pulse is tolerable since it is designed to cyclically interrupt the excitation process and produce conditions conducive to relaxation of the lower laser level. During this period the upper laser level is also depopulated and this represents a slight loss in efficiency. This loss, however, is well compensated by other advantages of the cyclic laser operation.

Another important characteristic for an efficient cyclic laser is that the energy level structure be such that spontaneous emission from the upper laser level to the sink level is trapped. The trapping of spontaneous emission from the upper laser level may be achieved when there is a high population in the sink level as in the case of a sink level comprising the single ground level in the energy level structure.

The cyclic laser has a common characteristic with the non-cyclic collision laser in that the debilitating reliance on spontaneous emission is eliminated to provide inherently greater efficiency (the cyclic laser is expected to produce average laser power on the order of 0.1 watt/centimeter$^3$ with potential efficiency of approximately 10%). The cyclic laser however, provides advantages over the non-cyclic collision laser. This is basically due to the fact that selective population of the upper laser level is achieved by a technique which allows the upper laser level to be at a fairly high energy level.

The present invention operates in accordance with the general principles of the low level cyclic laser but extends these principles to ionic working media to provide further advantages as set forth below. More specifically, this invention utilizes ionic working media in which the lower energy level is relatively close to a relatively low energy ionic ground level comprising the sink level of the ionic laser. In the preferred embodiment of the invention, the working media may be any of the alkaline earth metals of Group II of the Periodic Table, i.e. calcium, strontium, and barium (and theoretically radium).

The ionic cyclic lasers of the invention have a number of advantages compared to the neutral low level cyclic lasers of application No. 510,618. For one, the temperature required to vaporize the working media of the invention is substantially lower, thereby making feasible a sealed-off system and simplifying numerous other practical considerations. Of great importance also is the output wavelength achieved. Thus, ionized calcium and strontium produce radiation in the infrared-visible border region of the electromagnetic spectrum which has many practical applications.

Other features and advantages of the invention will be apparent from a consideration of the following description in conjunction with the appended drawings, in which.

Figure 1:
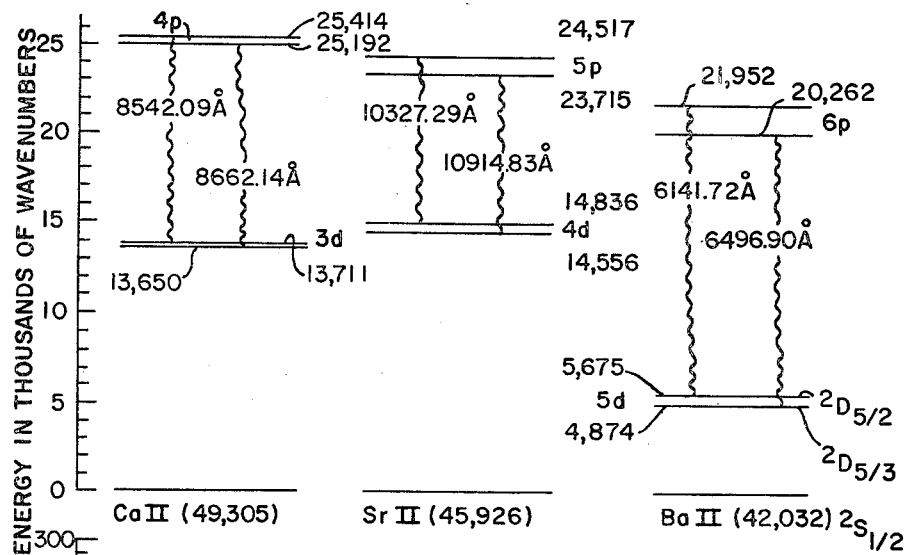
FIGURE 1 shows energy level diagrams of calcium, strontium and barium useful in explaining the operation of an ionic cyclic laser utilizing any one of these elements as a working medium.

In the explanation which follows the terms laser and light amplifier will be used interchangeably to refer to apparatus making use of the phenomenon of light amplification by stimulated emission of radiation.

A discussion of theoretical considerations relating to the cyclic laser of said application No. 510,618 and the present invention follows prior to consideration of specific illustrative forms of cyclic laser apparatus embodying the invention.

From the previous introductory explanation, it will be appreciated that laser efficiency is poor if the energy of excitation to the upper laser level (or the uppermost level in the essential laser energy circuit) is much greater than the laser transition energy. Unfortunately, this must be the case if spontaneous emission is to depopulate the lower level. Relaxation by inelastic collisions renders it unnecessary to use laser levels lying high in the energy level structure, but according to previous proposals such lasers should also have a mechanism for simultaneously selectively populating the upper level and selectively depopulating the lower level, both at a rate sufficient to maintain a population inversion. The cyclic laser avoids the necessity for simultaneous excitation and relaxation processes, thus considerably widening the choice of working media which may be utilized and widening the available range of laser characteristics (e.g., output wavelength).

In the common laser systems of the prior art, the spontaneous decay rate of the excited level is greater than $10^7/S$, characteristic of "allowed" electric dipole radiative transitions. Since the excitation rate is of the order of $10^5$/sec.-atom even using the efficient and selective method of collisions of the second kind, the excited level population could not be made greater than the ground level population. Therefore, light amplifier action or emission in the common prior art laser systems occurs only to an intermediate level whose population is kept lower by an even faster rate of spontaneous decay.

In "collision lasers" depopulation of a lower laser level by collisions of the second kind is contemplated. The collision laser requires that the relaxation process employed to depopulate the lower laser level be such that it does not substantially depopulate the upper laser level (which would have the undesirable effect of reducing the population inversion). This technique of collision lasers is limited to working media with energy level structures of a rather special kind.

Cyclic lasers according to application No. 510,618 and the present invention have the advantage that excitation and relaxation occur during different time intervals and it is unnecessary that the relaxation mechanism for the lower laser level be one that does not affect the upper laser level.

In the cyclic laser the laser transition is partially forbidden. This prevents the transitions from occurring so rapidly as to make it difficult or impossible to build up and exploit a population inversion during a current pulse. The build-up of the population in the upper laser level is expedited by an allowed transition between the sink level (neutral or ionic ground, as the case may be) and the upper laser level with a high electron cross-section for the transition. In rare cases the sink to upper level transition could be partially forbidden, but this is not the optimum situation. The cyclic laser is also rendered more efficient by having as a sink level a single ground level, or at most a few closely spaced "isolated" ground levels. Such an energy level structure results in trapping of spontaneous radiation from the upper laser level to the ground level due to the high population in the ground level (or levels). Possible "leakage" of excited atoms through other than the laser transition is thus minimized.

In the cyclic ionic laser of the present invention the sink level is the ionic ground level which, of course, is substantially above the neutral ground level. However, despite the necessary high energy level of an ionic laser, the energy levels of the invention are relatively low compared to other known ionic lasers, thereby providing increased efficiency.

FIGURE 1 shows the energy level diagrams for the ionic energy levels of calcium, strontium, and barium as indicated on the drawing. In each of the diagrams of FIG. 1, the energy level is measured with respect to the ion ground level of the associated element which, of course, is relatively high in the overall energy level structure. The number in parentheses following the identification of each of the elements in FIG. 1 is the energy in wave numbers of the ion ground state of that element relative to neutral ground.

The laser transitions of the elements represented in FIG. 1 are shown by wavy lines. Each of the elements includes two practical laser transitions. Referring to calcium, for example, the first transition is from an upper level of 25,414 wave numbers to a lower level of 13,711 wave numbers (both of which being measured with respect to ionic ground, i.e., 49,305 wave numbers) to produce a wavelength equal to 8542 angstroms which is in the infrared portion of the electro-magnetic spectrum. The second practical laser transition of calcium produces an output wavelength of 8662 angstroms which is also in the infrared portion of the spectrum.

In the same fashion, the practical laser transitions for strontium and barium are illustrated in FIG. 1. Strontium also produces two outputs in the infrared region although the outputs of barium are in the visible region.

Of the remaining members of Group II of the Periodic Table, beryllium and magnesium do not have inner $d$ shells to provide the lower laser level, and only calcium, strontium, barium, and radium will provide the correct energy level structures. However, in the case of radium, which is radioactive, the practical difficulties involved in utilizing this substance as a laser medium are probably insurmountable. The elements, calcium, strontium and barium are frequently referred to as the alkaline earth metals and this definition has been adopted for purposes of this specification and the attached claims.

In three (or more) level laser systems including an upper laser level, a lower laser level, and a sink level, the energy lost in the transition from the lower laser level to the sink level is inherently wasted and represents a basic limitation on efficiency. Accordingly, it is highly desirable that the energy level of the lower laser level be kept at a relatively low value. In the case of the cyclic ionic laser (as opposed to the cyclic neutral laser of said application S.N. 510,618) there is no effective lower limit for the lower laser level energy since the ionic energy levels are all relatively high, and the equilibrium population of an ionic lower level will not normally prevent a population inversion with respect to the upper laser level.

It is also desirable that the upper laser level be the first resonance level above the ion ground or sink level. This assures highly selective pumping to the upper laser level to the virtual exclusion of other levels higher than the upper level, thereby eliminating unwanted transitions which would be a source of losses leading to inefficiency. Nearly the same advantages are obtained if the upper laser level is close to the first resonance level. These criteria are met by the energy level structures of the alkaline earth metals represented in FIG. 1.

As previously noted, the laser transition in a cyclic laser should be partially forbidden (i.e., slow compared to the minimum attainable input pulse rise time), and this situation prevails for the alkaline earth metal lasers depicted in FIG. 1. Moreover, the energy levels of an alkaline earth metal above the upper laser level are relatively distant or otherwise poorly coupled to the ionic ground level so that relatively little energy is wasted in pumping to these levels above the upper laser level.

The energy level structures of the alkaline earth metals are also ideal from another point of view in that in each case the ion ground level which constitutes the sink level is a single isolated level so that the upper laser level is trapped with respect to the sink level, whereby loss of energy due to transitions directly from the upper laser level to the sink level is minimized. Technically speaking, the upper laser level is not actually trapped with respect to the ground neutral level, but only because the ionization or deionization process requires transfer of an electron, which processes are sufficiently slow to be the controlling factor in preventing this transition. Consequently, the loss of energy due to transitions directly from the upper laser level to both the ion ground and neutral ground levels is minimized.

It is also desirable to depopulate the lower laser level at a moderately rapid rate for various reasons, one of which is to enable operation of the laser at a high repetition rate. Relaxation of the lower laser level may take place primarily by three mechanisms: (1) diffusion to (and collision with) the wall of the laser, (2) collision with cool electrons, (3) collision with molecules of a gas added for this purpose, e.g., nitrogen. Relaxation by diffusion to the laser walls is facilitated by a small diameter laser tube, but this puts an undesirable constraint upon the volume of the laser. The invention contemplates the use of any of these techniques to accelerate relaxation of the lower level.

Figure 2:
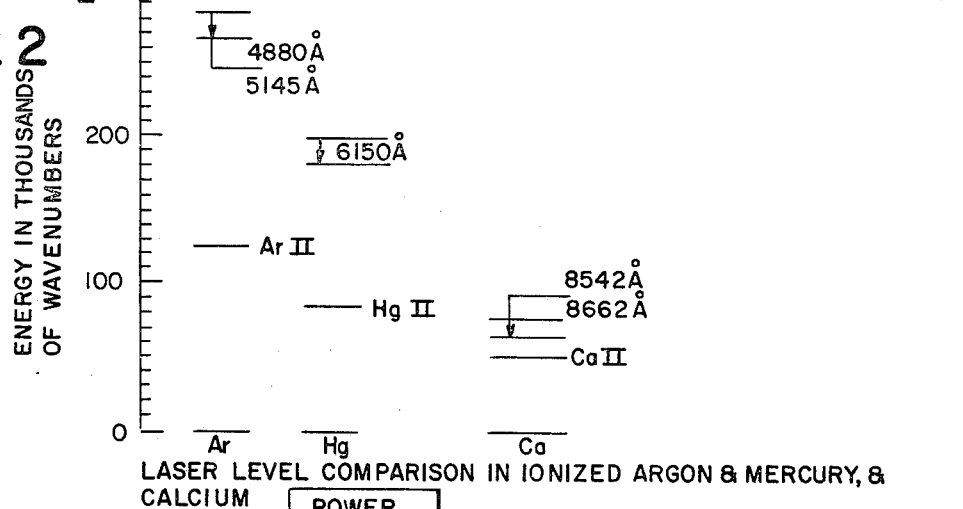
FIGURE 2 is an energy level diagram of ionized argon and mercury useful in explaining the limitations of previous ionic lasers and the advantages of ionic lasers according to the present invention.

FIG. 2 shows the energy level diagrams of argon and mercury ion lasers as compared to one of the alkaline earth metals of the invention, calcium. FIG. 2 clearly shows that in calcium the lower laser level energy is substantially less than that of the lower laser level in either argon or mercury. Accordingly, it follows that the quantum efficiency of the calcium (and other alkaline earth metals) ion laser will be substantially higher than that of argon or mercury.

It is useful at this point to summarize the foregoing discussion indicating the criteria for an effective cyclic ion laser according to the invention.

The primary excitation of the atoms is by collisions with free electrons. In the "off" period of the excitation cycle the lower laser level population is relaxed by inelastic collisions. It may be useful to include an admixed molecular gas such as nitrogen to promote relaxation of the lower level (without disadvantageously affecting the population of the upper level during excitation). Ideal characteristics (not fully realizable in all cases as a practical matter) of such an ionic cyclic laser are summarized below:

(a) The laser transition is slow compared to the pulse rise time (i.e., partially forbidden).

(b) The transition from the lower laser level to the ion ground (sink) level is forbidden or at least more forbidden than the transition from the sink level to the upper laser level. Energy level structures which involve a lower laser level and a sink level of the same parity are desirable.

(c) The transition between the ion ground or sink level and the upper laser level is an allowed transition (and preferably the upper laser level is the first resonance level or near the first resonance level).

(d) The sink level is a single isolated ion ground level preferably, but in any event the sink levels are few and closely spaced so that they are sufficiently populated to trap spontaneous emission from the upper laser level to the sink levels.

(e) Relaxation of the upper state may be and frequently is faster than the relaxation of the lower state. This is tolerable because achievement of a population inversion in the cyclic laser depends upon difference in excitation rates between the upper and lower levels and the process contemplates that the lower laser level will fill up to destroy the population inversion and terminate the laser pulse.

(f) Relaxation of the lower level is by processes other than spontaneous emission and particularly by inelastic collisions with the laser wall or with other particles.

It should be noted that the amount of energy which can be stored in the upper level in the ion cyclic discharge lasers is large compared with most other gas lasers.

Figure 3:
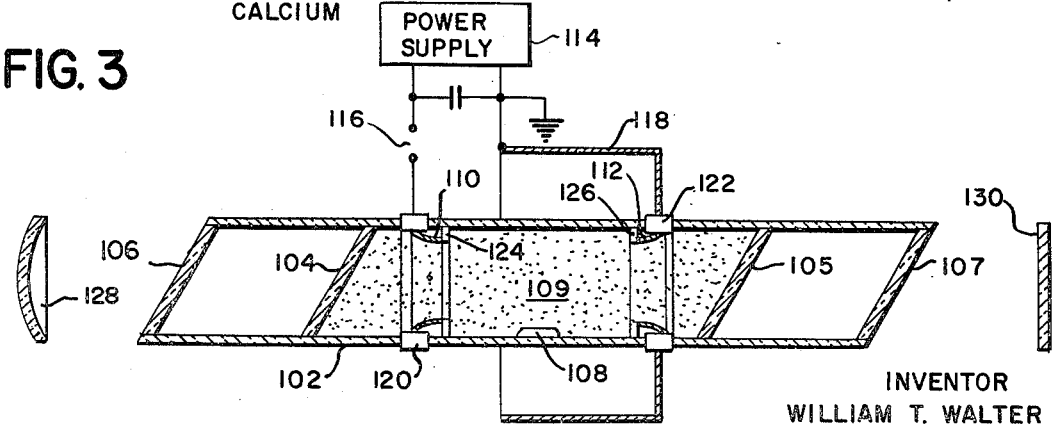
FIGURE 3 is an illustration of an ionic cyclic laser according to the present invention and utilizing calcium as a working medium by way of illustration.

Referring to FIG. 3, laser apparatus is shown which is particularly adapted for use as an ionic cyclic laser according to the present invention. The apparatus includes an elongated cylindrical tube 102 formed of a material such as alumina or Lucalox which is resistant to high temperature and to corrosive action. Alumina tube 102, which is inherently opaque, is provided with internal windows 104 and 105 preferably formed of sapphire. Windows 104 and 105 are tilted at Brewster's angle to minimize loss at the windows. The outer ends of the alumina tube 102 are closed by windows 106 and 107 which may be made of sapphire or quartz. Windows 104 and 105 are not made of quartz because of the deleterious effect thereon of the alkaline earths. The space between windows 104 and 106 and windows 105 and 107 is preferably evacuated in any desired fashion and the windows are sealed to the alumina tube 102 to form a gastight seal.

A piece of calcium metal (or other alkaline earth) is placed within alumina tube 102 between the windows 104 and 105. The calcium may be heated by the pulse discharge alone or by any conventional heating means to its temperature of vaporization. For example, at a pressure of 0.1 torr the calcium may be heated to a temperature of approximately 690° C. At the same pressure, strontium and barium may be heated approximately to 630° C. and 710° C., respectively. As previously mentioned, these relatively low temperatures for a cyclic laser comprise one of the advantages of the invention. The pressure is maintained low to facilitate selective excitation of the upper ion energy level. To this end also, the diameter of the tube 102 may be reduced although, on the other hand, this has the undesirable effect of reducing the volume of the working medium and also the trapping. To some extent also, selection of the upper energy level is dependent upon the applied voltage.

Annular electrodes 110 and 112 are provided within tube 102 for generation of a pulse discharge in the calcium vapor 109. A power supply 114 applies the input pulse across the electrodes 110 and 112 through a spark gap 116. An outer conductive cylinder 118 surrounds the tube 102 and electrically connects the ground side of power supply 114 to the electrode 112. Cylinder 118 has reduced inductance and provides improved power coupling. Annular conductive seals 120 and 122 are used to seal the tube 102 to the electrodes 110 and 112 respectively to maintain the low pressure within the tube while permitting application of the discharge pulse across the electrodes. The electrodes 110 and 112 are enclosed by guard rings 124 and 126, respectively, which may be made of alumina or Lucalox and force the discharge to occur between the inner surfaces of the electrodes 110 and 112.

The apparatus is provided with a suitable reflector system comprising, for example, a concave reflector 128 and a partially transparent flat reflector 130. As well known, such a reflector system supplies the necessary regeneration for the laser apparatus to operate as an oscillator to generate coherent radiation. Other alternative reflector systems may be utilized.

The operation of the alkaline earth ion laser illustrated in FIG. 3 has previously been explained from a quantum-mechanical point of view and such explanation need not be repeated. The condensed vapor may be restored in any desired manner including, for example, a capillary system for recirculating the condensed liquid. Furthermore, it is not necessary that a pure element be introduced into the alumina tube 102. For example, good results have been achieved using calcium hydroxide in place of the calcium 108.

Obviously, other types of laser physical structures may be used in accordance with the principles of this invention. For example, the constructions disclosed in application Ser. No. 510,618 would also have utility with cyclic ionic laser of the present invention.

Thus, the invention provides an ionic laser in which the upper and lower laser energy levels are substantially lower than the upper and lower laser energy levels of other known ionic lasers, thereby providing significantly increased efficiency. In the case of the preferred materials, i.e., the alkaline earth metals, the operating temperatures required for vaporization of the working media are relatively low, and a sealed off system is practical. In the specific case of calcium as a working medium, the laser output has a wavelength in a spectral region of marginal visibility (infrared), which is of important practical advantage.

Modifications and additions to those suggested and other variations with respect to the present invention will be apparent to those of skill in the art. Accordingly, the scope of the present invention should not be limited to those variations and modifications suggested, and, it is therefore aimed to cover all such variations and modifications as fall within the true spirit and scope of the invention.

What is claimed is:

1. Laser apparatus for intensification of infrared or visible electromagnetic radiation comprising a bounded volume containing a gaseous laser working medium, said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

2. Laser apparatus for intensification of infrared or visible electromagnetic radiation comprising a bounded volume containing a gaseous laser working medium, said medium having a pair of ionic energy levels differing in energy by an amount corresponding to an infrared or visible electromagnetic radiation frequency wherein the lower level of said pair of levels is between about 60,000 and 75,000 wave numbers above the neutral ground level and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

3. Laser apparatus for intensification of infrared or visible electromagnetic radiation comprising a bounded volume containing an alkaline earth metal in the form of an atomic gas as a laser working medium, said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

4. Laser apparatus for intensification of infrared or infrared or visible electromagnetic radiation comprising a bounded volume containing a gaseous laser working medium, said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and wherein the transition between said third level and said upper level is an allowed transition, and means for cyclically exciting said medium to produce intermittently a population inversion with respect to said pair of levels and for alternately relaxing said lower level between excitation periods.

5. Laser apparatus for intensification of infrared or visible electromagnetic radiation comprising a bounded volume containing a gaseous laser working medium, said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and wherein the radiation of the transition from said upper level to said third level is trapped, and means for cyclically exciting said medium to produce intermittently a population inversion with respect to said pair of levels and for alternately relaxing said lower level between excitation periods.

6. Laser apparatus for intensification of infrared or visible electromagnetic radiation comprising a bounded volume containing a gaseous laser working medium, said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level are of the same parity and defining an at least partially forbidden transition, and means for cyclically exciting said medium to produce intermittently a population inversion with respect to said pair of levels and for alternately relaxing said lower level between excitation periods.

7. Laser apparatus for intensification of infrared or visible electromagnetic radiation comprising a bounded volume containing a gaseous laser working medium, said medium having a pair of ionic energy levels differing in energy by an amount corresponding to an infrared or visible electromagnetic radiation frequency and a third sink level of the ionic ground spectroscopic term wherein there is no energy level between said lower level and said third level, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

8. Laser apparatus for intensification of infrared or visible electromagnetic radiation comprising a bounded volume containing a gaseous laser working medium having a suitable monatomic vapor pressure at a temperature between about 600° C. and 1000° C., said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

9. Laser apparatus for intensification of infrared or visible electromagnetic radiation comprising a bounded volume containing a gaseous laser working medium, said medium having a pair of ionic energy levels differing in energy by an amount corresponding to an infrared or visible electromagnetic radiation frequency and a third sink level of the ionic ground spectroscopic term, the upper level being a resonance level, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

10. Laser apparatus for intensification of infrared or visible electromagnetic radiation comprising a bounded volume containing a gaseous laser working medium, said medium being an atomic vapor of the element calcium and said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

11. Laser apparatus for intensification of infrared or visible electromagnetic radiation comprising a bounded volume containing a gaseous laser working medium, said medium being an atomic vapor of the element strontium and said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

12. Laser apparatus for intensification of infrared or visible electromagnetic radiation comprising a bounded volume containing a gaseous laser working medium, said medium being an atomic vapor of the element barium and said medium having a pair of ionic energy levels differing in energy by an amount corresponding to an infrared or visible electromagnetic radiation frequency and a third sink level of the ionic ground spectroscopic term, the upper level and lower level of said pair of levels defining a partially forbidden electric dipole transition, said lower level and said third level defining an at least partially forbidden transition, and means for cyclically exciting said medium to produce intermittently a population inversion with respect to said pair of levels and for alternately relaxing said lower level between excitation periods.

References Cited

UNITED STATES PATENTS 3,243,715    3/1966    Welton _____ 330—4.3

OTHER REFERENCES

Fowles et al.: "High-Gain Laser Transition in Lead Vapor," Applied Physics Letters, vol. 6, pp. 236–237, June 15, 1965.

Piltch et al.: "Pulsed Laser Transitions in Manganese Vapor," Applied Physics Letters, vol. 7, pp. 309–310, Dec. 1, 1965.

ROY LAKE, Primary Examiner

SIEGFRIED H. GRIMM, Assistant Examiner

U.S. Cl. X.R.

330—4.3